(12) United States Patent
Yano et al.

(10) Patent No.: US 9,566,734 B2
(45) Date of Patent: Feb. 14, 2017

(54) DRIVE MECHANISM OF INJECTION MOLDING MACHINE

(71) Applicant: FANUC Corporation, Yamanashi (JP)

(72) Inventors: Satoshi Yano, Yamanashi (JP); Koichi Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/863,891

(22) Filed: Sep. 24, 2015

(65) Prior Publication Data

US 2016/0096301 A1 Apr. 7, 2016

(30) Foreign Application Priority Data

Oct. 3, 2014 (JP) .................................. 2014-204786

(51) Int. Cl.
*B29C 45/17* (2006.01)
*B29C 45/50* (2006.01)

(52) U.S. Cl.
CPC ....... *B29C 45/5008* (2013.01); *B29C 45/1775* (2013.01); *B29C 2045/5056* (2013.01)

(58) Field of Classification Search
CPC ............. B29C 45/1775; B29C 45/5008; B29C 2045/5056
See application file for complete search history.

(56) References Cited

U.S. PATENT DOCUMENTS

| 6,530,774 B2 * | 3/2003 | Emoto | B29C 45/5008 425/542 |
| 6,652,264 B2 * | 11/2003 | Yokoya | B29C 45/17 425/574 |
| 6,755,636 B2 * | 6/2004 | Nishio | B29C 45/5008 264/40.1 |

FOREIGN PATENT DOCUMENTS

| EP | 2535162 A1 | 12/2012 |
| JP | 11-138599 A | 5/1999 |
| JP | 2012-166530 A | 9/2012 |
| JP | 2013-000984 A | 1/2013 |

OTHER PUBLICATIONS

Office Action in JP Application No. 2014-204786, mailed Nov. 24, 2015.

* cited by examiner

*Primary Examiner* — James Mackey
(74) *Attorney, Agent, or Firm* — Hauptman Ham, LLP

(57) ABSTRACT

A drive mechanism of an injection molding machine includes a position adjustment part capable of adjusting a relative position between a rear plate and a motor fixing member. The position adjustment part includes a plurality of screw holes formed in the motor fixing member, a plurality of bolts threadedly engaged with these screw holes, and an abutting part that abuts on these bolts. These bolts are rotated to abut on the abutting part, so that the relative position between the rear plate and the motor fixing member can be adjusted.

8 Claims, 3 Drawing Sheets

DRIVE MECHANISM OF INJECTION MOLDING MACHINE

RELATED APPLICATIONS

The present application claims priority to Japanese Application Number 2014-204786, filed Oct. 3, 2014, the disclosure of which is hereby incorporated by reference herein in its entirety.

BACKGROUND OF THE INVENTION

Field of the Invention

The present invention relates to a drive mechanism of an injection molding machine, and more particularly to a drive mechanism of an injection molding machine having an adjustment function of the shaft centers of a ball screw shaft and a motor shaft.

Description of the Related Art

An example of a configuration of a conventional injection molding machine will be described with reference to FIG. 4 and FIG. 5.

A movable plate 1 is supported by a guide member 2 to be movable in an axial direction. A ball screw nut 3 is fixed to this movable plate 1 in a manner such that it does not rotate, and a ball screw shaft 4 is engaged with the ball screw nut 3. This ball screw shaft 4 is supported by a rear plate 5 through a bearing 21, and is rotatable, but is unmovable in the axial direction. The ball screw shaft 4 thus configured is rotated, so that the ball screw nut 3 moves in the axial direction. Consequently, the movable plate 1 to which the ball screw nut 3 is fixed also moves.

The ball screw shaft 4 is rotationally driven by a ball screw driving motor 8. The ball screw driving motor 8 is fixed to the rear plate 5. A shaft of the driving motor 8 and the ball screw shaft 4 are coupled by a coupling member 6, so that torque of the driving motor 8 can be transmitted to the ball screw shaft 4.

In a ball screw drive mechanism of an injection molding machine, in a case where a ball screw shaft and a shaft of a ball screw driving motor are coupled with each other through a coupling member, the shaft center of ball screw shaft is preferably made to coincide with the shaft center of the motor shaft. In order to achieve this, it is necessary to improve the accuracy of the machining of each of a motor fixing part and a ball screw shaft fixing part. However, even when each machining accuracy is improved, it is necessary to provide a slight clearance in order to mount each member, and such a clearance could lead to deviation of the shaft centers.

As a conventional technology for solving such a problem, Japanese Patent Application Laid-Open No. 11-138599 discloses an in-line screw type electric injection molding machine in which a pair of injection motors are mounted on a rear surface of a pressure plate by using a bracket, respectively, and the output shafts of these motors are coupled to rear ends of ball screw shafts. Additionally, Japanese Patent Application Laid-Open No. 2013-984 discloses an injection apparatus in which the driving shaft center is aligned with the screw shaft center.

However, the above Japanese Patent Application Laid-Open No. 11-138599 discloses that the driving motor is fixed to the rear plate by means of the bracket, but does not disclose how to fix the bracket or does not disclose an adjustment mechanism for making the shaft center of the ball screw shaft coincide with the shaft center of the motor shaft.

Japanese Patent Application Laid-Open No. 2013-984, mentioned above, describes an adjustment mechanism for aligning the screw shaft center with the driving shaft center, wherein an adjustment protrusion is movable in an adjustment recess, but does not describe how to move the adjustment protrusion or how to adjust a slight deviation of the shaft centers.

SUMMARY OF THE INVENTION

An object of the present invention is to provide a drive mechanism of an injection molding machine in which the shaft center of a ball screw shaft and the shaft center of a motor shaft can be suitably aligned with each other with a simple configuration.

A drive mechanism of an injection molding machine according to the present invention includes: a movable plate capable of advancing and retreating along a guide member; a rear plate provided in such a manner that it faces the movable plate; a ball screw including a ball screw nut and a ball screw shaft; a driving motor for driving the ball screw shaft through a coupling member; and a motor fixing member to which the driving motor is fixed. The ball screw nut is fixed to the movable plate, the ball screw shaft is rotatably supported by the rear plate so as not to be movable in an axial direction, and the motor fixing member is disposed such that a relative position thereof with respect to the rear plate is adjustable. This drive mechanism of an injection molding machine further includes a position adjustment part capable of adjusting the relative position between the rear plate and the motor fixing member. The position adjustment part includes: at least one screw hole that penetrates the motor fixing member or an extension member extending from the motor fixing member, and has a thread; a bolt of which thread is engaged with the thread of the screw hole; and an abutting part that abuts on the bolt.

The abutting part may be provided in the rear plate, or the abutting part may be provided in a motor-fixing-member supporting member that supports the motor fixing member.

The screw holes may be provided at two or more places in the motor fixing member or the extension member such that directions of center axes are different from each other.

According to the present invention, it is possible to provide a drive mechanism of an injection molding machine in which the shaft center of the ball screw shaft and the shaft center of the motor shaft can be suitably aligned with each other with a simple configuration.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENT

Figure 4:
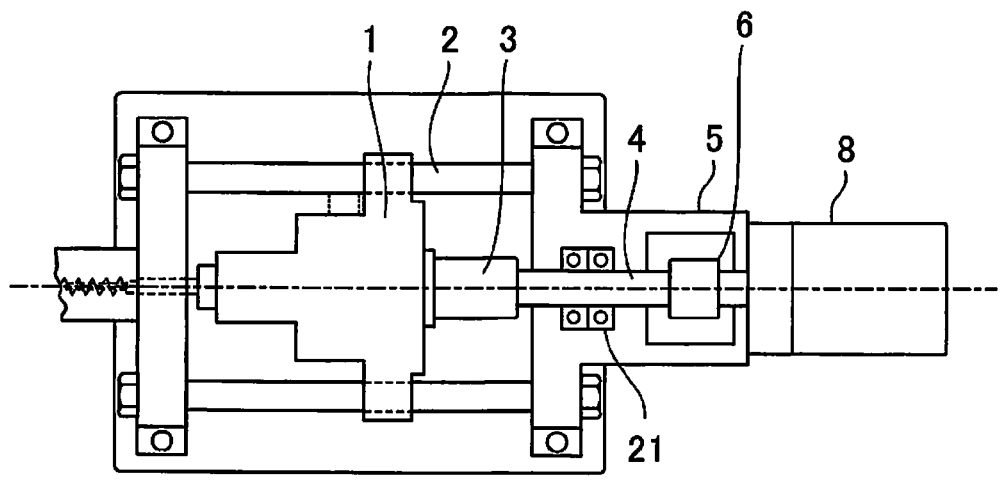
FIG. 4 is a plan view of a drive mechanism of a conventional injection molding machine.
Figure 5:
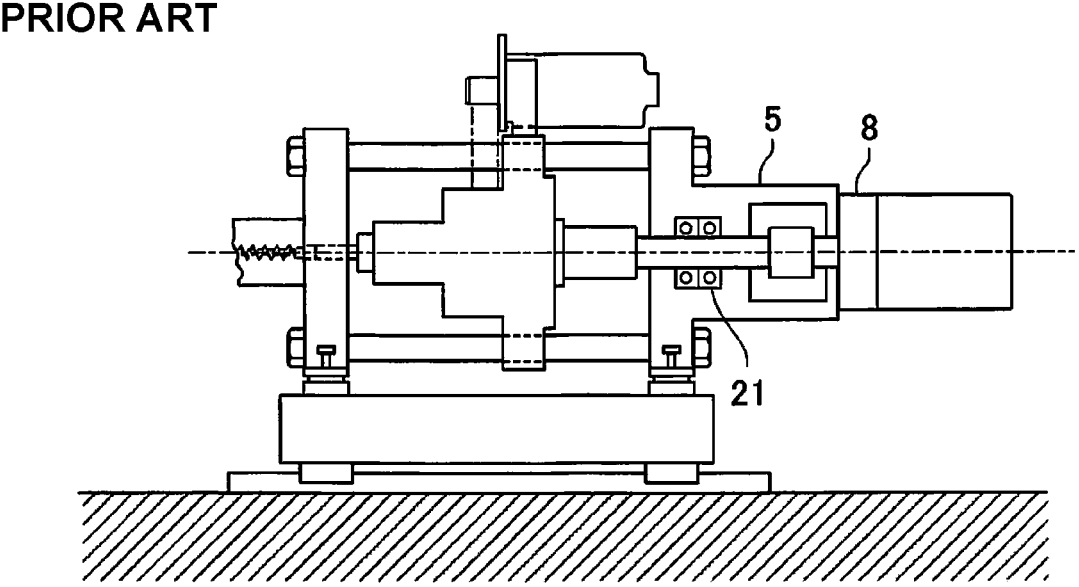
FIG. 5 is a front view of the drive mechanism of the injection molding machine in FIG. 4.

First, a first embodiment of a drive mechanism of an injection molding machine according to the present invention will be described with reference to FIG. 1 and FIG. 2. Components similar to the components of the conventional technologies illustrated in FIG. 4 and FIG. 5 are denoted by the same reference numerals, and descriptions thereof are omitted.

In a motor fixing member 7 that fixes a ball screw driving motor 8 for rotationally driving a ball screw shaft 4, first, second and third screw holes 9a, 9b and 9c are provided so as to penetrate the motor fixing member 7. These screw holes 9a, 9b and 9c are formed with respective female screws. The shaft centers of first and second bolts 10a and 10b engaged with the first and second screw holes 9a and 9b are directed to a horizontal direction, and face each other, as illustrated in the plan view of FIG. 1. On the other hand, as illustrated in the front view of FIG. 2, the shaft center of a third bolt 10c engaged with third screw hole 9c is directed in a vertical direction.

A distal end of a first bolt 10a engaged with the first screw hole 9a abuts on (an abutting part 15a of) an outer wall surface of a rear plate 5. Additionally, while a distal end of a second bolt 10b engaged with the second screw hole 9b faces the outer wall surface of the rear plate 5, the second bolt 10b is installed such that the distal end is in a non-contact state with the rear plate 5. Consequently, the motor fixing member 7 is movable in the horizontal direction in a section until contact with second bolt 10b, by pressing by the first bolt 10a.

Figure 1:
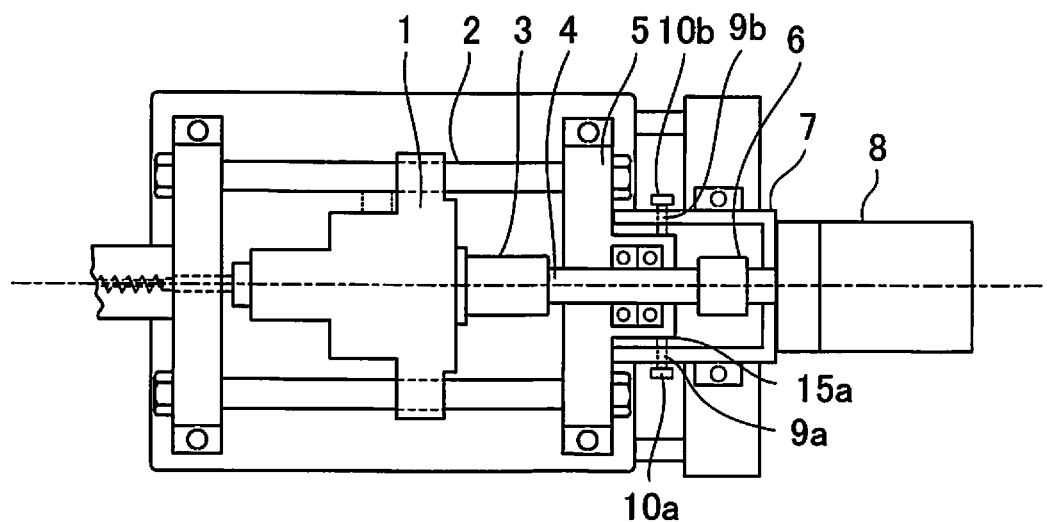
FIG. 1 is a plan view of a first embodiment of a drive mechanism of an injection molding machine according to the present invention.

In FIG. 1, the distal end of the first bolt 10a directly abuts on (an abutting part 15a of) an outer wall surface of the rear plate 5. However, an abutting member (not illustrated) may be separately provided at a part of the rear plate 5 which is in contact with the first bolt 10a, as the abutting part 15a, and the distal end of the first bolt 10a may abut on the abutting member.

Figure 2:
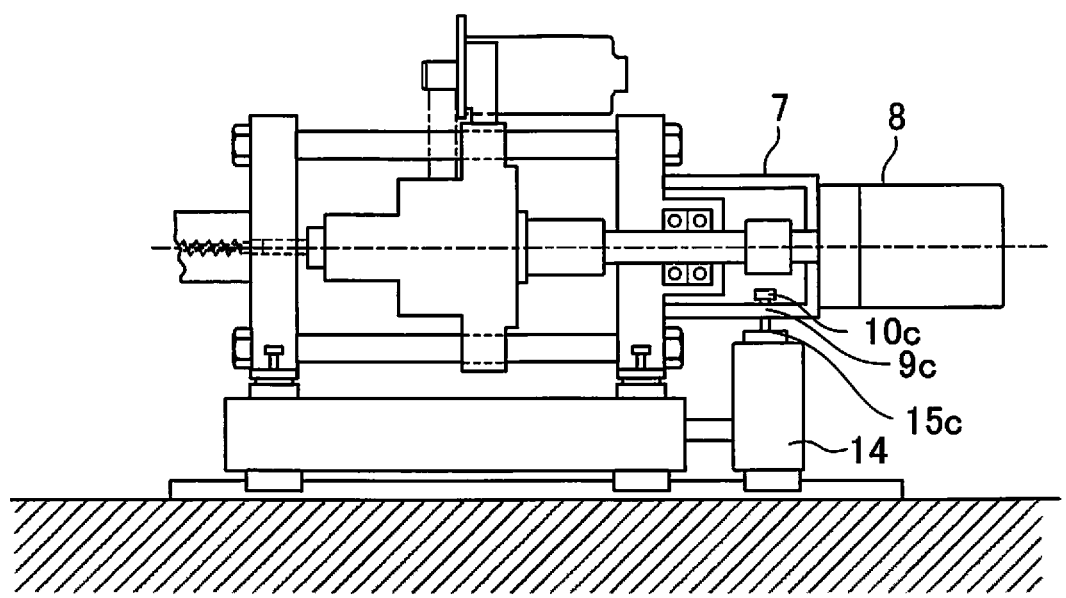
FIG. 2 is a front view of the drive mechanism of the injection molding machine in FIG. 1.

On the other hand, (an abutting part 15c of) a motor-fixing-member supporting member 14 for supporting the motor fixing member 7 abuts on the third bolt 10c engaged with the third screw hole 9c, as illustrated in FIG. 2. This motor-fixing-member supporting member 14 is a separate member from the rear plate 5. This pressing force of third bolt 10c makes the motor fixing member 7 movable in the vertical direction.

In FIG. 2, the distal end of the third bolt 10c directly abuts on (an abutting part 15c of) an outer wall surface of the motor-fixing-member supporting member 14. However, an abutting member (not illustrated) may be separately provided at a part of the motor-fixing-member supporting member 14 which is in contact with the third bolt 10c, as the abutting part 15c, and the distal end of the third bolt 10c may abut on the abutting member.

Now, a second embodiment of the drive mechanism of the injection molding machine according to the present invention will be described with reference to FIG. 3.

In the afore-mentioned first embodiment, the third screw hole 9c is provided in the motor fixing member 7, and the distal end of the third bolt 10c engaged with the third screw hole 9c abuts on the motor-fixing-member supporting member 14. In this second embodiment, instead, an extension member 16 integrated with a motor fixing member 7 is provided in the motor fixing member 7, a fourth screw hole 9d is provided in the extension member 16, and a distal end of a fourth bolt 10d engaged with the fourth screw hole 9d abuts on (an abutting part 15d of) an outer wall surface of a rear plate 5, in place of the above.

Striking the distal end of the fourth bolt 10d engaged with the fourth screw hole 9d against (an abutting part 15d of) an outer wall surface of the rear plate 5, the motor fixing member 7 moves in a vertical direction. In FIG. 3, the distal end of the fourth bolt 10d directly strikes against (the abutting part 15d of) the outer wall surface of the rear plate 5. However, an abutting member (not illustrated) may be separately provided at a part of the rear plate 5 which is in contact with the fourth bolt 10d, as the abutting part 15d, and the abutting member may strikes against the distal end of the fourth bolt 10d.

In FIG. 2, the extension member 16 is a member that extends from the motor fixing member 7 and is integrated with the motor fixing member 7. However, the extension member 16 may not be necessarily integrated with the motor fixing member 7, and the extension member 16 may be configured by fixing a separate member to the motor fixing member 7 with bolts or the like. Additionally, the shape of the extension member 16 in this embodiment is merely an example, and can be a shape other than a shape illustrated in FIG. 3.

Figure 3:
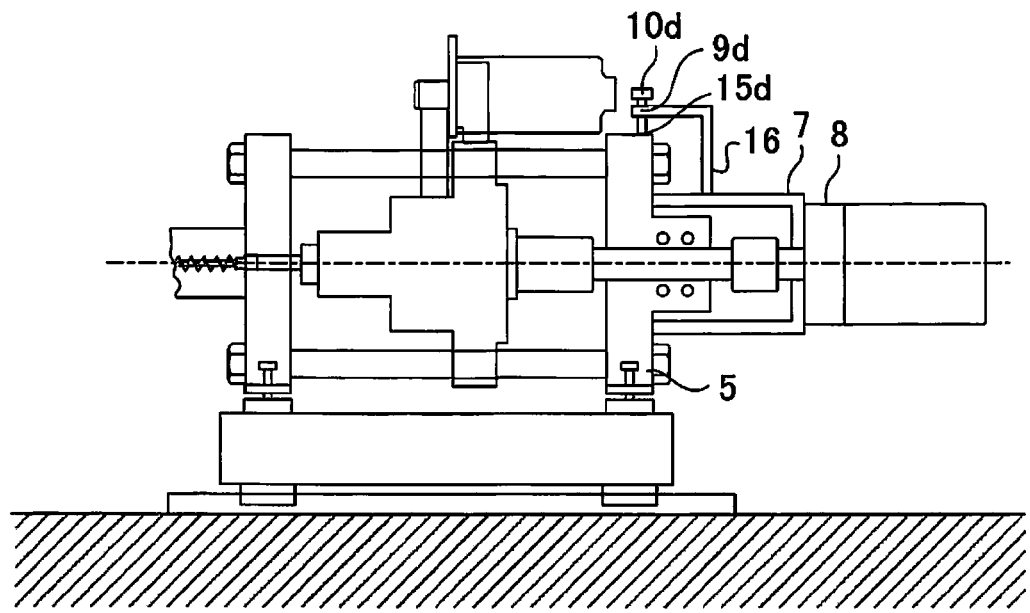
FIG. 3 is a front view of a second embodiment of a drive mechanism of an injection molding machine according to the present invention.

Furthermore, in the example illustrated in FIG. 3, the extension member 16 provided in the motor fixing member 7 is a single member. But, it is possible that two or more extension members are provided, respective screw holes are formed in the extension members, respective bolts are engaged with the screw holes, and the ends of the bolts are caused to abut on respective abutting parts of the outer wall surface of the rear plate 5, thereby enabling positional adjustment in a direction different from a vertical direction (e.g., horizontal direction).

What is claimed is:

1. A drive mechanism of an injection molding machine comprising:
    a movable plate configured to advance and retreat along a guide member;
    a rear plate facing the movable plate;
    a ball screw including a ball screw nut and a ball screw shaft;
    a driving motor configured to drive the ball screw shaft through a coupling member; and
    a motor fixing member to which the driving motor is fixed, wherein
    the ball screw nut is fixed to the movable plate,
    the ball screw shaft is rotatably supported by the rear plate so as not to be movable in an axial direction,
    the motor fixing member has an adjustable relative position with respect to the rear plate,
    the drive mechanism further comprises a position adjustment part configured to adjust the relative position between the rear plate and the motor fixing member, and
    the position adjustment part includes:
        a first screw hole extending in a first direction of the injection molding machine;
        a second screw hole extending in a second direction of the injection molding machine, the second direction being perpendicular to the first direction,
        a first bolt threadably engaged with a thread of the first screw hole,
        a second bolt threadably engaged with a thread of the second screw hole,
        a first abutting part that abuts on the first bolt, said first abutting part being provided on the rear plate; and a second abutting part that abuts on the second bolt, said second abutting part being provided on one of the motor fixing member and a motor-fixing-member supporting member that supports the motor fixing member.

2. The drive mechanism according to claim 1, wherein the first abutting part is provided on a bearing supporting part of the rear plate.

3. The drive mechanism according to claim 1, wherein the second abutting part is provided on the motor-fixing-member supporting member that supports the motor fixing member.

4. The drive mechanism according to claim 1, wherein the screw holes are provided at two or more places in the motor fixing member or an extension member extending from the motor fixing member, such that directions of center axes of the ball screw shaft and a shaft of the motor are different from each other.

5. An injection molding machine comprising a drive mechanism, the drive mechanism comprising:
   a movable plate configured to advance and retreat along a guide member;
   a rear plate facing the movable plate;
   a ball screw including a ball screw nut and a ball screw shaft;
   a driving motor configured to drive the ball screw shaft through a coupling member; and
   a motor fixing member to which the driving motor is fixed, wherein
   the ball screw nut is fixed to the movable plate,
   the ball screw shaft is rotatably supported by the rear plate so as not to be movable in an axial direction,
   the motor fixing member has an adjustable relative position with respect to the rear plate,
   the drive mechanism further comprises a position adjustment part configured to adjust the relative position between the rear plate and the motor fixing member, and
   the position adjustment part includes:
      a first screw hole extending in a first direction of the injection molding machine;
      a second screw hole extending in a second direction of the injection molding machine, the second direction being perpendicular to the first direction,
      a first bolt threadably engaged with a thread of the first screw hole,
      a second bolt threadably engaged with a thread of the second screw hole,
      a first abutting part that abuts on the first bolt, said first abutting part being provided on the rear plate; and
      a second abutting part that abuts on the second bolt, said second abutting part being provided on one of the motor fixing member and a motor-fixing-member supporting member that supports the motor fixing member.

6. The injection molding machine according to claim 5, wherein
   the first abutting part is provided on a bearing supporting part of the rear plate.

7. The injection molding machine according to claim 5, wherein
   the second abutting part is provided on the motor-fixing-member supporting member that supports the motor fixing member.

8. The injection molding machine according to claim 5, wherein
   the screw holes are provided at two or more places in the motor fixing member or an extension member extending from the motor fixing member, such that directions of center axes of the ball screw shaft and a shaft of the motor are different from each other.

* * * * *